Nov. 14, 1950  V. E. MURRAY  2,529,623
TWO-SPEED REAR AXLE TRANSMISSION
Filed Dec. 30, 1947  4 Sheets-Sheet 1

Inventor
Victor E. Murray.
By Murray, Sackhoff & Paddack
Attorneys.

Nov. 14, 1950 V. E. MURRAY 2,529,623
TWO-SPEED REAR AXLE TRANSMISSION
Filed Dec. 30, 1947 4 Sheets-Sheet 2

Inventor
Victor E. Murray.
By Murray, Sackhoff & Paddack
Attorney's

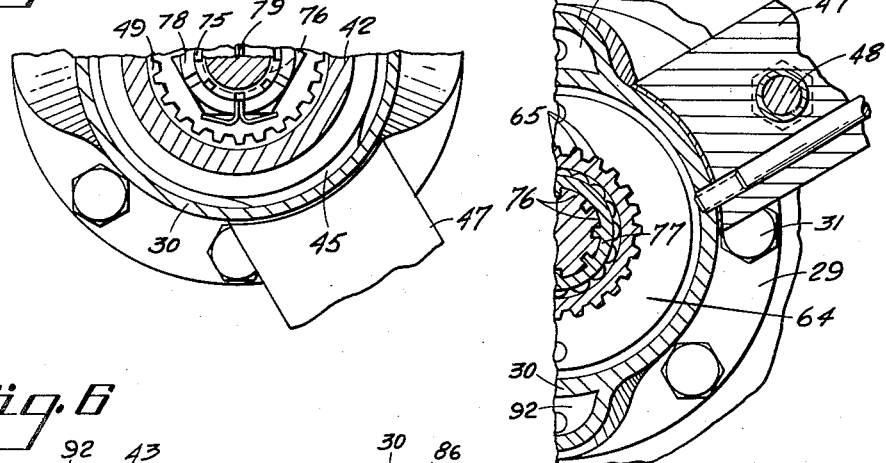

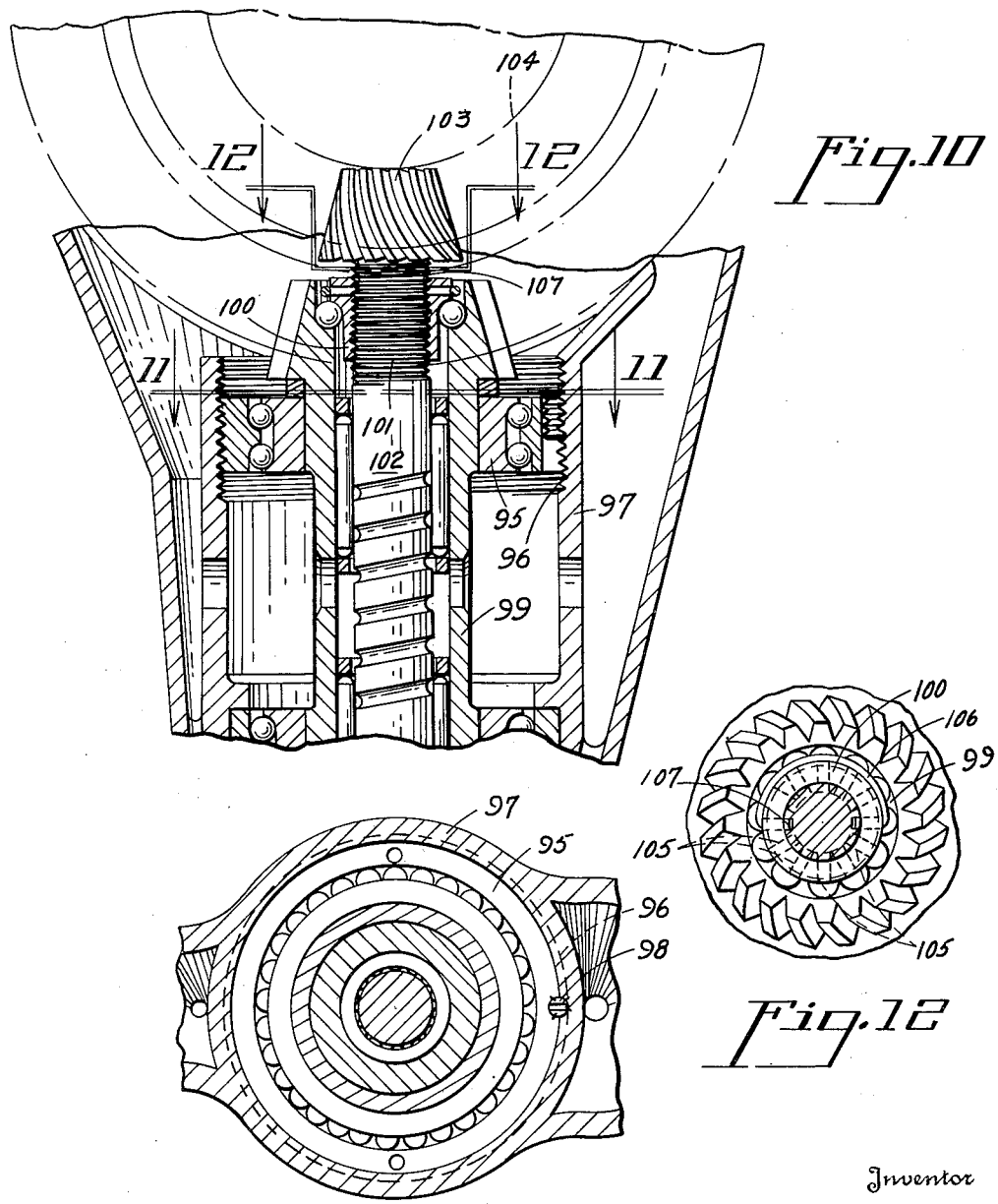

Patented Nov. 14, 1950

2,529,623

UNITED STATES PATENT OFFICE 2,529,623

TWO-SPEED REAR AXLE TRANSMISSION

Victor E. Murray, Cincinnati, Ohio, assignor of sixty per cent to Charles H. Reedy, Cincinnati, Ohio Application December 30, 1947, Serial No. 794,468

7 Claims. (Cl. 74—700)

The present invention relates to a two speed rear axle transmission mechanism for motor vehicles and has for an object the provision of a simple and relatively inexpensive structure of this kind that is easily assembled in the motor vehicle.

Another object of the invention is to provide a mechanism of this kind wherein the high and low speed shafts are mounted as a unit in a slender elongated cylindrical housing which is removably connected at opposite ends to the rear axle housing and a clutch casing fixed to the torque tube of a vehicle.

Another object of the invention is to provide a simple and easily adjusted arrangement of the aforementioned parts in which the clutch takes the form of a small diameter cup shaped element that is separably supported with relation to the relatively removable shaft housing unit permitting the use of external clutch teeth on the ends of said shafts to extend forwardly of the bearings so that the clutch operates in front of the bearings instead of intermediate the bearings.

Still another object of the invention is to provide a slender and compact nesting of the high and low speed shafts permitting the use of high and low speed pinions that are as nearly the same physical diameter as possible, and at the same time employing ample anti-friction bearings between the shafts, if desired.

A further object of the invention is to provide an arrangement of the class described that affords easy and rapid adjustment of the high and low speed pinion shafts from the forward end of the cylindrical housing which is removably connected to the clutch casing and thus provides for easy assembly and separation of the clutch and the shafts.

A still further object of the invention is to provide a unitary cylindrical housing assembly that is arranged and adapted for automatic lubrication in the normal operation of the vehicle in which it is used.

These and other important objects are attained by the means described herein and exemplified in the accompanying drawings, in which:

Fig. 5 is an enlarged fragmental cross-section view taken on line 5—5 of Fig. 4.

Fig. 6 is an enlarged fragmental cross-sectional view taken on line 6—6 of Fig. 4.

Fig. 7 is an enlarged fragmental cross-sectional view taken on line 7—7 of Fig. 4.

Fig. 8 is a cross-sectional view taken on line 8—8 of Fig. 2, but showing the clutch engaged for driving the small or low speed pinion and ring gear.

Fig. 9 is a cross-sectional view taken on line 9—9 of Fig. 1.

Fig. 10 is a fragmental longitudinal sectional view of a modified form of the device of the invention.

Fig. 11 is a cross-sectional view taken on line 11—11 of Fig. 10.

Fig. 12 is a cross-sectional view taken on line 12—12 of Fig. 10.

The so-called two speed rear axle drive for motor vehicles is known in the automobile art and literature, but has rarely been in practical use despite the universally admitted theoretical superiority of principle of operation thereof. However, various practical difficulties have prevented the adoption of heretofore proposed devices. The previously known devices have been too complex and costly and sometimes too bulky and difficult of lubrication to become generally accepted in the industry.

The device of the invention eliminates the known disadvantages by employing a relatively slender elongated assembly having fewer, less expensive and more easily assembled and adjusted parts that are readily adapted to the differential case of a vehicle. Moreover, the structure of the invention by its simplified construction avoids all difficulties in adjustment of the high and low speed pinions and in lubrication of the parts so that efficient, trouble free operation is provided.

Figure 1:
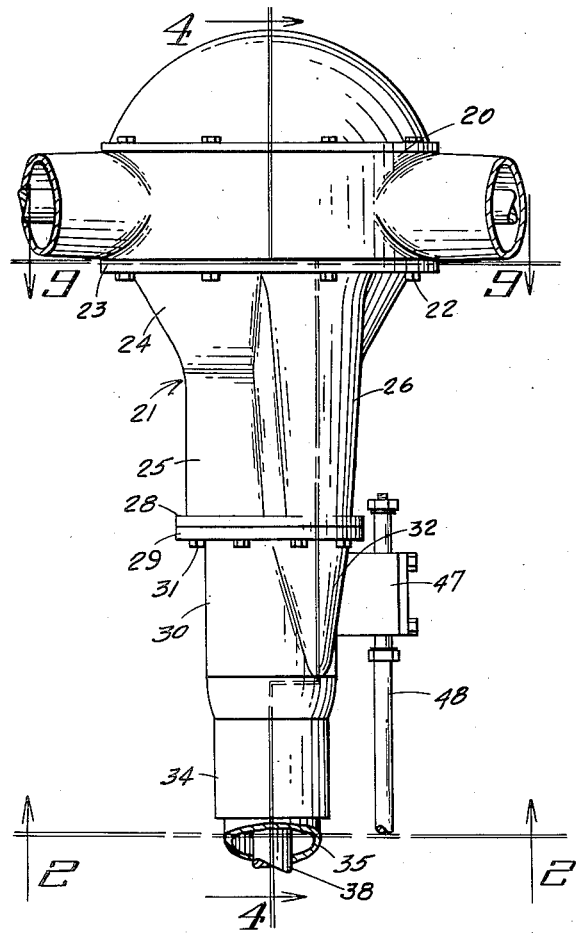
Fig. 1 is a fragmental top plan view of a rear housing assembly with a device of the invention connected between it and the torque tube surrounding the vehicle drive shaft.
Figure 3:
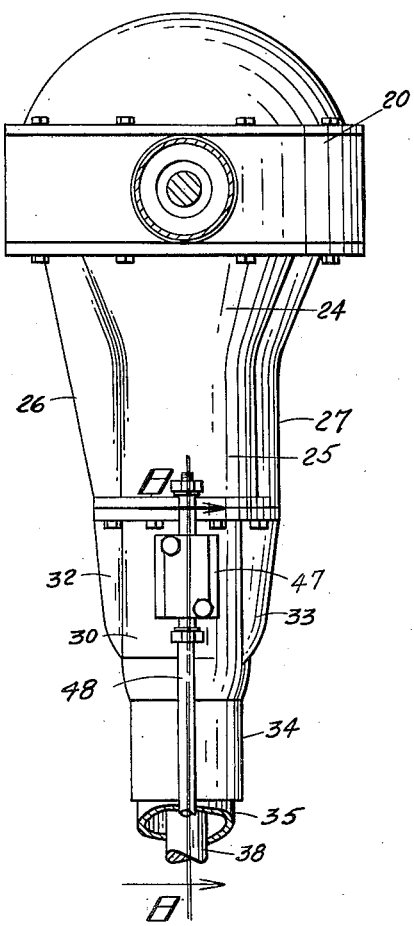
Fig. 3 is a cross-sectional view taken on line 3—3 of Fig. 1.

As shown in Fig. 1 the rear axle housing 20 of a motor vehicle has the removable unit 21 of the invention secured thereto by screws 22 passing through the integral flange 23 on the flared rear end 24 of the housing 25 and into the axle housing 20. The housing 25 is of a generally cylindrical form, but has an integral hollow rib 26 extending lengthwise along its upper exterior, and an opposite exterior hollow rib 27 disposed along its lower exterior. The forward end of housing 25 has a bolting flange 28 to which a mating flange 29 of a clutch casing 30 is removably connected by screws 31. Casing 30 has hollow ribs 32 and 33 communicating with ribs 26 and 27 respectively on housing 25.

Figure 2:
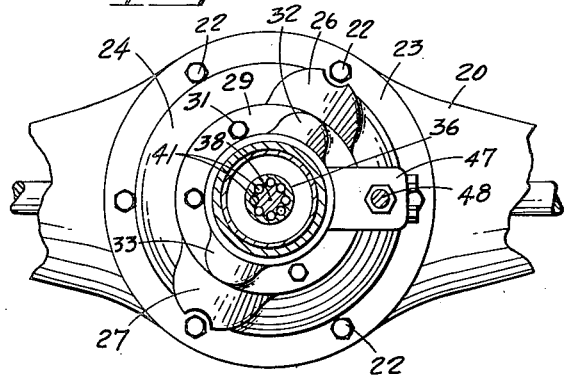
Fig. 2 is a side elevational view of the structure shown in Fig. 1.

As can be seen in Figs. 1, 2 and 8, the cylindrical forward end 34 of clutch casing 30 has the shortened rear end of torque tube 35 received therein and rigidly fixed by any suitable means, not shown, for example as by welding the concentric overlapped and snugly fitting parts 34 and 35 together.

Figure 4:
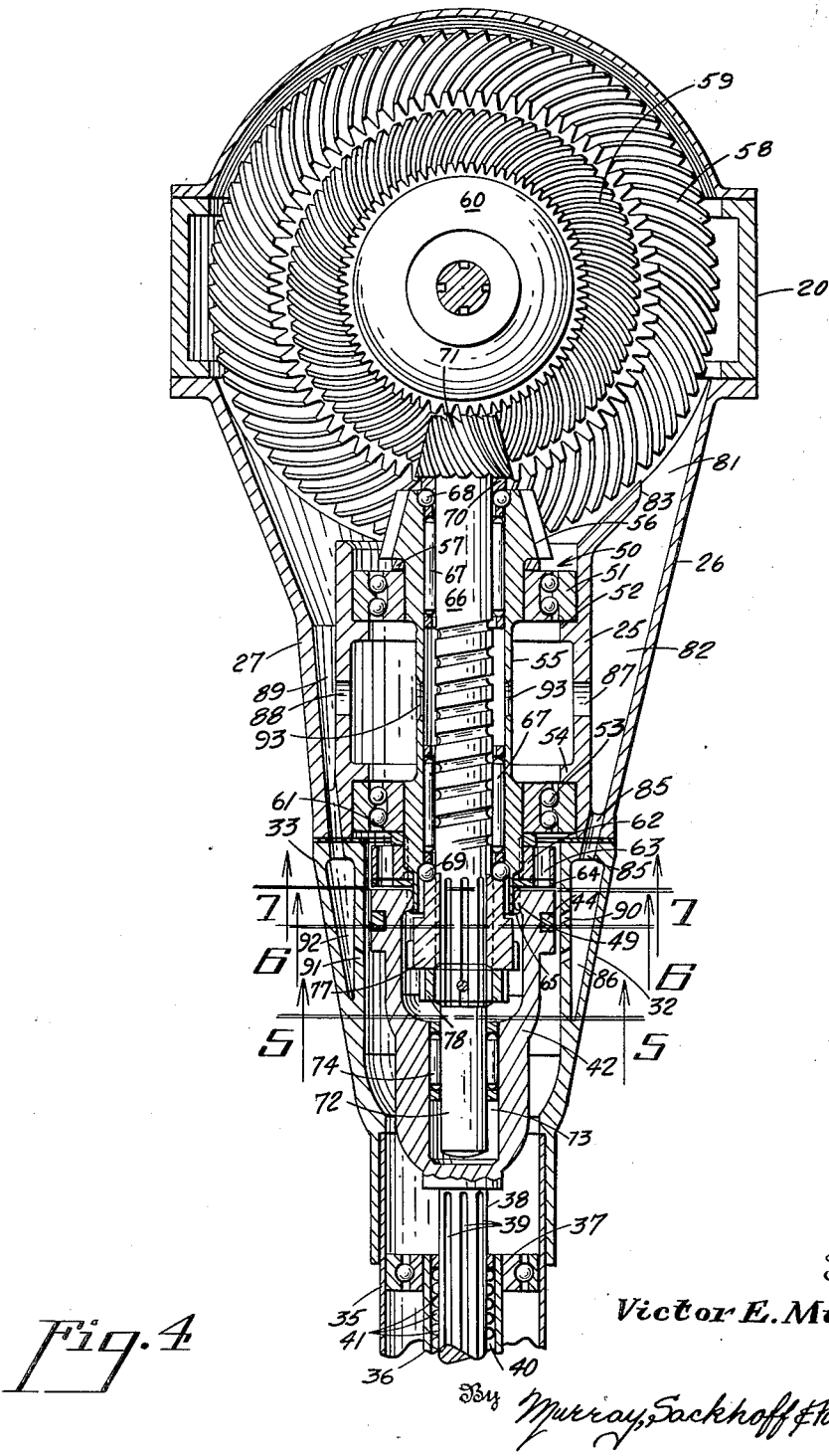
Fig. 4 is a cross-sectional view taken on line 4—4 of Fig. 1 and showing the clutch engaged for driving the large or high speed pinion and ring gear.

As shown in Figs. 2, 4 and 8 the drive shaft 36 of the car is tubular and is desirably supported near its end by a ball bearing 37 mounted in the reenforced or strengthened end of the torque tube 35. The clutch shaft or stem 38 is provided with longitudinal flutes or grooves 39 which correspond wih grooves 40 in the inside wall of tubular drive shaft 36 and a series of steel balls 41 in each corresponding pair of grooves 39—40 serve to impart rotation from the drive shaft to the clutch shaft and at the same time permit longitudinal shifting of the clutch shaft with ease under any and all driving conditions.

The drive clutch element 42 is formed integrally with its shaft 38 and has an external annular groove 43 for receiving the arms 44 of a shifter fork 45, which extends through a longitudinal guide slot 46 in the clutch casing 30. A bracket 47 secured exteriorly to casing 30 serves to cover slot 46 and to effect a support for the reciprocable clutch rod 48 which has fork 45 mounted thereon inside said bracket.

Clutch element 42 has at its rear end a series of internal clutch teeth 49 formed after the general fashion of spur gear teeth in profile and arranged for easy meshing and selective engagement with the hereinafter described complementary externally toothed members on the high and low speed pinion shafts.

As shown in Fig. 1 the cylindrical unit housing 25 has mounted on its inner wall adjacent the rear end, a main radial thrust bearing 50, the outer race 51 of which is held against forward thrust by engagement on a shoulder 52. A second main radial thrust bearing 53 is seated interiorly of the forward end of unit casing 25 against a shoulder 54. These main thrust bearings 50 and 53 are thus spaced apart substantially the full length of the cylindrical unit housing. A tubular high speed shaft 55 is supported close to its opposite ends on the inner races of bearings 50 and 53. At its rear end shaft 55 has a high speed bevel pinion 56, which in this embodiment is formed integral therewith, and a collar 57 is interposed between the bottom of the gear and the adjacent inner race of thrust bearing 50 designed or selected to secure a proper meshing relationship between pinion 56 and large bevel ring gear 58, which gear and a concentrically arranged small bevel ring gear 59 are suitably attached to the differential body 60 located within the rear axle housing 20 in any accepted manner.

The forward end of tube shaft 55 is surrounded by a collar 61 which abuts or is formed integral with the inner race of the forward main thrust bearing 53.

The shaft 55 is threaded for a short distance forwardly of the collar 61 for receiving an internally threaded adjustment ring 62 which has spanner holes 63 whereby the ring is turned for drawing it into abutment with bearing 53. The collar 61 is thus brought to contact the inner race of main bearing 53 after which further movement of said ring draws up the shaft 55 so that pinion 56 and collar 57 are suitably adjusted with relation to the rear face of the inner race on main bearing 50. Ring 62 has an internally toothed washer 64 secured on its forward face in any suitable manner, such as by spot welding (not shown). The extreme end of shaft 55 is of reduced diameter and has numerous longitudinal grooves that are shallow and angular in cross section to form clutch teeth 65 complementary to the internal teeth 49 on the sliding clutch 42. The teeth of sheet metal lock washer 64 are adapted to be bent forwardly at an angle sufficient to clear clutch teeth 65 on shaft 55 during the adjustment of the end thrust of shaft on its main bearings. When this adjustment is completed the lock washer teeth may be bent again into the plane of the washer body and entered between the clutch teeth 65 to positively lock the ring 62 against turning. The top lands of the clutch teeth are quite narrow and little movement of the ring will ever be required to enable the locking teeth of washer 64 to enter between the clutch teeth 65. Any other suitable lock nut may be used in lieu of the lock washer just described.

The tubular high speed shaft is arranged to support the low speed shaft 66 on thin roller bearings or needle bearings 67 that fill the annular space between the inside wall of the tube shaft 55 and the exterior of shaft 66, said needle bearings being extended sufficiently to transmit the radial thrust of shaft 66 to the tube shaft 55 directly beneath the large main thrust bearings 50 and 53. The extreme ends of shaft 55 are counterbored to receive the bearing balls 68 and 69 respectively at opposite ends, thus providing for end thrust bearing of the low speed shaft 66 on shaft 55 in both directions. The end thrust bearings comprising balls 68 and 69 are more widely spaced than the main thrust bearings 50 and 53 through which the end thrust of both the high speed shaft and the low speed shaft is transmitted ultimately to the cylindrical unit housing 25.

It is to be understood that anti-friction type bearings of any other type may be employed to journal shaft 66 in tube shaft 55 and that if desired taper friction bearings may be used in lieu of anti-friction bearings. This is made possible because of the low speed differential that exists between the two shafts. The shafts 55 and 66 rotate constantly in the same direction so that shaft 66 turns relatively slowly in its bearings which are turning with shaft 55.

A collar 70 of proper thickness is interposed between the small drive pinion 71 which may be integral with the rear end of shaft 66 and is arranged to mesh with the low speed ring gear 59 on the differential body 60. The forward end of shaft 66 has an extended end section 72 which projects into the hollow cylindrical bore 73 in sliding clutch body 42 in which needle bearings 74 are provided to assure radial support for the parts of all speeds. This constitutes a pilot bearing for the clutch 42, and it is to be understood it may be omitted and the device may be correspondingly shortened if desired. There are longitudinal grooves 75 forming external teeth 76 between them arranged on shaft 66 so that an adjustable clutch element 77 having complementary grooves may be mounted on said shaft for rotation therewith. Element 77 has a rear end of reduced diameter entering in non-contacting relation into the counterbored forward end of shaft 55 to abut the bearing thrust balls 69.

A nut 78 is threadedly engaged on suitable interrupted threads (not detailed) on the top of teeth 76 so that the low speed clutch element may be moved to abut the thrust balls 69 and then draw low speed pinion 71 and collar 70 to adjust the thrust on the balls 68. The forward thrust bearing 68 may be omitted and an angle roller bearing (not shown) substituted therefor, or a conventional taper thrust bearing may be employed between the end of the counterbore and the rear end of clutch element 77. The nut may be slotted or drilled for reception of means such as a cotter pin or the equivalent 79 passing through the shaft to lock the parts in adjusted position in known manner.

Clutch 77 has at its exterior end adjacent said nut 78 a series of clutch teeth 80 corresponding to teeth 65 and complementary to drive clutch teeth 49, and said teeth 65 on the high speed tubular shaft 55 and teeth 80 on the low speed shaft 66 are spaced apart at adjacent ends at a distance only slightly in excess of the length of drive clutch 49 so that short axial movement of clutch 42 will include a minimum safe neutral space through which teeth 49 pass in moving from full clutching engagement with one of said shafts to full clutching engagement with the other. It should be noted that the circumference of member 77 intermediate the teeth 65 and 80 is in substantially the plane of the top lands of clutch teeth 49 which guide on said circumference in passing through neutral position during shifting. The shifting of the clutch is smooth and positive for the further reason that the long and anti-friction drive relation between the tubular drive shaft 36 and clutch shaft 38 is held against vibration by bearing 37 supporting the drive shaft while the clutch body 42 is held vibrationless intermediate its ends by the needle bearings 74 riding slidably and rotatably on the extension 73 of shaft 66 and the top lands of teeth 49 are supported on the grooves of the teeth 65 and 80.

The ring gears 58 and 59 operate in a body of oil filling the approximately lower half of axle housing 20 so that oil is thrown centrifugally from the peripheries of both said ring gears into the open rear end 81 of the top longitudinal cored oil passage 82 in the rib 26. A lip or dam 83 extends upwardly for a distance from the bottom of the opening 81 to prevent ready exit of oil from the passage through said opening. Oil passage 82 is tapered longitudinally and has an end bore 84 connecting with an end bore 85 in the cored oil passage 86 in the top rib 32 of the clutch casing 30. The cylindrical wall of housing 25 has an opening 87 in that portion thereof that forms a bottom for the passage 82 in top rib 26 so that oil may flow gravitationally from passage 82 into the interior of housing 25 between bearings 50 and 53 and an oil pool is thus maintained therein. A correspondingly related opening 88 is formed in the housing 25 in that portion which forms the top of a return oil passage 89 in the rib 27, which passage permits a return oil flow back into the pool in housing 20.

One or more holes 90 permit oil flow from passage 86 to the interior of clutch casing 30. A hole 91 permits the return flow of oil from casing 30 to the cored passage 92 in the rib 33 which passage connects with the bottom oil passage 89 in bottom rib 27 of housing 25. The tube shaft 55 has a pair of diametrically opposed bores 93 permitting free entry of the plenum oil supply in housing 25 to pass to all of the bearings for the solid shaft 66. The shaft 66 may have a helical oil groove 94 to assist in agitation of the oil supply within the tube shaft.

Under normal operating conditions the automatic forced lubrication will maintain a circulating oil supply to the drive shaft bearing 37 and to the splined clutch shaft 38 as well as to all operating parts in both the clutch casing 30 and housing 25.

In the structure of the invention the main bearings are of the preload type so that proper and quiet meshing of the high speed pinion 56 with its ring gear 58 may be had by selecting the required thickness of the collar 57. The necessary adjustment is attained in assembly in a relatively rapid easy manner and may be maintained indefinitely by the locked threaded adjustment ring 62.

In a kindred manner the collar 70 is selected to provide the critical meshing relation between low-speed pinion 71 and its ring gear 59 and the end play in shaft 66 is adjusted by means of its sleeve-like clutch element 77 and the lock nut 78.

In the modification illustrated in Fig. 10 the outer race of the rear main bearing 95 is circumferentially threaded for axial adjustment in the internal threads 96 of the cylindrical housing 97 and is locked in position by a threaded pin 98. The tube shaft 99 freely receives in its rear end an internally threaded and externally shouldered adjusting sleeve 100 which receives the threads 101 of the low speed shaft 102 to provide rapid and accurate independent adjustment of shaft 102 therein and thus provide critical meshing relation of low speed pinion 103 and its ring gear 104. The sleeve 100 has a number of diametrically opposed pairs of bores 105 adapted to receive the inturned ends of a snap lock ring element 106 and permit said ends to enter shallow longitudinal slots 107 which transverse the threads 101 on shaft 102. It will be understood that the aforementioned parts are intended to be adjusted accurately and but once during the initial assembly of the mechanism in a given vehicle with a minimum of time and effort.

The operation of the device will be readily understood. The clutch operating rod 48 may be reciprocated to opposite limits by any suitable means under the control of the operator within the vehicle. The shifting device for the purpose forms no part of the present device and may operate by vacuum or electrical or other known means. Such operating means should moreover be interconnected to permit actuation only when the vehicle drive shaft is disengaged from the power of the engine.

The embodiment of the invention illustrated is by way of example and structural modifications may be made within the spirit of the invention and the scope of the appended claims.

What is claimed is:

1. In a two-speed rear axle transmission for a motor vehicle, the combination with a conventionally housed rear axle assembly having two ring gears, and a vehicle drive shaft within a torque tube, of a clutch casing fixedly connected to the rear end of said torque tube, a cup shaped clutch member mounted for rotation with the drive shaft and for limited reciprocation axially thereof in said casing, an elongated cylindrical housing adapted at its rear end for detachable connection with the open rear end of the said clutch casing, two angle contact bearings in opposed relation, mounted on the inside wall at the forward and rear ends respectively of the cylindrical housing, a tube shaft supported on said bearings and transmitting thrust in both directions thereto, a large bevel pinion on the rear end of said tube shaft meshing with one of the ring gears, the bevel pinion and relatively opposite end of its shaft being counterbored to provide anti-friction races therein, a solid elongated shaft extending through and beyond said tube shaft, a small bevel pinion on said elongated shaft meshing with the other of said ring gears, a collar on the solid shaft abutting the pinion and serving as a complementary race to the counterbore in the bevel pinion in the tube shaft, antifriction end thrust bearing members seating directly on said races, integral external clutch teeth on the forward end of the tube shaft extending into the clutch casing, a removably mounted clutch element adapted for fixed adjustment on the forward end of said elongated shaft, antifriction bearing members seating directly on the remaining counterbored race in the tube shaft and the end of said clutch member, the clutch element being provided with external clutch teeth similar to the integral teeth on the tube shaft and spaced axially therefrom, complementary internal teeth on the cup shaped clutch overhanging the forward ends of said shafts and selectively engageable on the external teeth of said shafts, and exteriorly controlled means for shifting said clutch.

2. In a two-speed rear axle transmission the combination of an elongated solid shaft having a small bevel pinion forming a shoulder at one end, a sleeve member mounted for non-rotating axial adjustment on the other end of said shaft and presenting a shoulder in spaced opposed relation to said pinion, external peripheral clutch teeth on the outer end of said sleeve, a tubular shaft surrounding said solid shaft intermediate the said pinion and the clutch teeth of said sleeve, said tubular shaft being counterbored to form integral ball races at opposite ends, thrust ball members in said counterbores to take end thrust of said pinion and said sleeve, a large bevel pinion on one end of said tubular shaft in closely spaced relation to the small bevel pinion, integral external peripheral clutch teeth on the opposite end of said tubular shaft, said teeth being similar to the teeth on said sleeve and in axially spaced relation thereto, a cylindrical housing, two angle bearings in opposed relation supported on the interior wall of said housing at substantially the opposite ends thereof and arranged to take thrust in both directions, said tubular shaft being supported on both said bearings with the large bevel pinion in thrust abutment with one of said two bearings, an abutment collar on said tube shaft abutting the other of said two bearings, independent means for adjusting the collar and the sleeve on their respective shafts, and a drive clutch member having internal clutch teeth for selective engagement with the external teeth on said tubular shaft and said sleeve respectively.

3. In a two-speed rear axle transmission the combination of a cylindrical housing adapted at its rear end for removable connection with a rear axle housing containing a rear axle assembly including two coaxial ring gears, two angle bearings supported on the inner wall of said housing in opposed relation at substantially opposite ends of the housing and arranged to take thrust in both directions, a tube shaft supported adjacent its opposite ends by said two bearings, a large bevel pinion on the rear end of said tube shaft and having shouldered thrust abutment on the rear bearing in said housing, the opposite end of said tube shaft extending beyond the forward bearing and having external clutch teeth thereon, an adjustable thrust collar connected to said tube shaft in thrust abutment with said forward bearing, said tube shaft counterbored to provide integral thrust bearing cups at opposite ends, thrust bearing members in said cups, a solid shaft extending axially through said tube shaft and having on its rear end a small bevel pinion adapted for thrust abutment on the bearing members in the rear end of said tube shaft and in spaced relation to the large bevel pinion, a sleeve splined on the forward end of said solid shaft and adapted at one end for entry in non-contacting relation into the counterbore at the forward end of said tube shaft and into thrust abutment with the bearing members therein, external clutch teeth on the forward end of the sleeve similar to and axially spaced from the clutch teeth on said tube shaft, needle bearings supporting said solid shaft on the inside of said tube shaft intermediate said thrust bearing members, a clutch casing adapted for fixed connection at its forward end with a vehicle torque tube and at its rear end for removable connection with the forward end of said cylindrical housing, a cup shaped clutch member having a forwardly extending stem adapted for rotation with and reciprocation on a vehicle drive shaft in said torque tube, said clutch having internal clutch teeth movable over the axially spaced external teeth on the ends of the tube shaft and the sleeve and complementary to said external teeth, and means supported on the exterior of the clutch casing for reciprocating the clutch member for selectively driving said shafts from the vehicle drive shaft.

4. In a device of the class described an outer tube shaft, an inner solid shaft passing through the hollow interior of the tube shaft and extending beyond its opposite ends, anti-friction radial bearings supporting said solid shaft on the interior of the tube shaft, said tube shaft being counterbored at opposite ends to form integral races for anti-friction thrust bearing elements, thrust bearing elements in said counterbores surrounding the solid shaft, a bevel pinion on the solid shaft transmitting end thrust to the thrust bearing elements adjacent thereto, a removably mounted clutch element on the opposite end of said shaft adapted to transmit end thrust to the thrust bearing elements in the corresponding end of the tube shaft and provided at its end with external clutch teeth, similar external clutch teeth formed integrally on the adjacent end of the tube shaft and axially spaced from the first mentioned external clutch teeth whereby an intermediate neutral space is provided, a bevel pinion carried by said tube shaft in closely spaced relation to the bevel pinion on said solid shaft, two angle bearings in opposed relation supporting the tube shaft adjacent the bevel pinion and clutch teeth respectively and arranged to take thrust in both directions, and a reciprocable cup shaped driving clutch movable over the extended external clutch teeth on said shafts and provided with a single series of internal clutch teeth for selective engagement with said clutch teeth on the respective shafts.

5. In a device of the class described an outer tube shaft, an inner solid shaft passing through the hollow interior of the tube shaft and extending beyond its opposite ends, anti-friction radial bearings supporting said solid shaft on the interior of the tube shaft, said tube shaft being counterbored at opposite ends, to form races for anti-friction thrust bearing elements, anti-friction thrust bearing elements in said counterbores surrounding the solid shaft, a bevel pinion on the solid shaft transmitting end thrust to the thrust bearing elements adjacent thereto, a removably mounted clutch element on the opposite end of said shaft adapted to transmit end thrust to the thrust bearing elements in the corresponding end of the tube shaft and provided at its end with external clutch teeth, similar external clutch teeth formed integrally on the adjacent end of the tube shaft and axially spaced from the first mentioned external clutch teeth whereby an intermediate neutral space is provided, a bevel pinion carried by said tube shaft in closely spaced relation to the bevel pinion on said solid shaft, two angle bearings in opposed relation supporting the tube shaft adjacent the bevel pinion and clutch teeth respectively and arranged to take thrust in both directions, and a reciprocable cup shaped driving clutch movable over the extended external clutch teeth on said shafts and provided with a single series of internal clutch teeth for selective engagement with said clutch teeth on the respective shafts, the circumference of the removable clutch element at the said neutral space affording a bearing for the top lands of the internal clutch teeth during shifting of the cup-shaped clutch.

6. The combination with a vehicle torque tube having a main drive shaft therein, of a cup-shaped clutch having an elongated stem axially shiftable on and in driven engagement with said drive shaft, a clutch casing fixed on the end of the torque tube and surrounding said clutch, a cylindrical housing unit detachably connected at its forward end to the rear end of said clutch casing, said housing adapted at its rear end for detachable connection with a rear axle housing, a pair of angle bearings supported on the interior wall of said housing unit at its forward and rear ends respectively adapted and arranged to take thrust in both directions, a tube shaft supported adjacent its ends by said bearings, external peripheral clutch teeth formed on the forward end of said shaft and extending into the clutch casing, said shaft being counterbored at opposite ends forming bearing races, annular series of thrust bearing elements in said counterbores seating directly on said races, a solid shaft passing axially through the tube shaft and said thrust bearing elements, anti-friction bearings supporting the solid shaft in said tube shaft intermediate said series of thrust bearing elements, a bevel pinion on the tube shaft in thrust abutment with the rear angle bearing, a bevel pinion on the solid shaft in thrust abutment with the series of thrust bearing elements in the rear counterbore of the tube shaft, an adjustment ring on the tube shaft rearwardly of the clutch teeth and in thrust abutment with the forward angle bearing, an axially adjustable sleeve splined on the forward end of the solid shaft in thrust abutment with the forward series of thrust bearing elements in the tube shaft, said sleeve having external clutch teeth similar to and in axially spaced relation to the external clutch teeth on the tube shaft whereby a limited neutral space is provided, and a single series of internal teeth on the cup-shaped clutch for selective engagement with the external peripheral teeth on said shafts.

7. In combination an elongated housing adapted at its rear end for removable connection with a rear axle housing, two angle bearings oppositely disposed adjacent the ends of said housing arranged and adapted to take thrust in both directions, a tube shaft supported adjacent its ends by said bearings, a bevel pinion on the rear end of said shaft in thrust abutment with the rear angle bearing, said tube shaft being counterbored at opposite ends to form internal thrust bearing races, an elongated solid shaft journalled in the tube shaft, anti-friction bearing members operative directly on said races, a bevel pinion on the rear end of the solid shaft and adapted for thrust abutment on the antifriction members on the rear internal race of the tube shaft, external clutch teeth on the forward end of the tube shaft, an adjustment ring on the tube shaft adjacent said teeth adapted for adjustable thrust abutment on the forward angle bearing, a sleeve for fixed mounting on the forward end of the solid shaft arranged at its rear end for entry into the forward counter-bore in the tube shaft for adjustable thrust abutment on the antifriction members on the internal race in said end of the tube shaft, said sleeve having external teeth on its forward end similar to the teeth on the tube shaft and spaced axially therefrom, a cup-shaped clutch having internal teeth selectively engageable with the external teeth of said shafts, a clutch casing surrounding said cup-shaped clutch adapted at its rear end for removable connection with the forward end of the housing, a vehicle drive shaft, means mounting said clutch for axially shiftable driven engagement with the rear end of said drive shaft, a torque tube enclosing said shaft, the forward end of the clutch casing fixedly mounted at its forward end on the rear end of said torque tube and exteriorly operable means for shifting said cup-shaped clutch.

VICTOR E. MURRAY.

REFERENCES CITED

The following references are of record in the file of this patent:

UNITED STATES PATENTS

| Number | Name | Date |
|---|---|---|
| 871,233 | Muren | Nov. 19, 1907 |
| 1,209,330 | Pleukharp | Dec. 19, 1916 |
| 1,259,065 | Anibal | Mar. 12, 1918 |
| 1,269,530 | Gargett | June 11, 1918 |
| 1,846,187 | Coulter | Feb. 23, 1932 |
| 1,929,611 | Skinner | Oct. 10, 1933 |
| 1,995,988 | Kitchen | Mar. 26, 1935 |
| 2,138,065 | Layman | Nov. 29, 1938 |
| 2,152,409 | Holtz | Mar. 28, 1939 |
| 2,241,606 | Kysor | May 13, 1941 |

FOREIGN PATENTS

| Number | Country | Date |
|---|---|---|
| 297,594 | Italy | June 16, 1932 |